United States Patent
Kwon et al.

(10) Patent No.: US 8,792,395 B2
(45) Date of Patent: Jul. 29, 2014

(54) WIRELESS TRANSCEIVER SYSTEM FOR SUPPORTING DUAL MODE

(75) Inventors: Heon-Kook Kwon, Daejeon (KR); Joon-Hyung Kim, Daejeon (KR); Seong-Min Kim, Daejeon (KR); Yun-Soo Ko, Daejeon (KR); Jae-Ho Jung, Daejeon (KR); Kwang-Chun Lee, Daejeon (KR)

(73) Assignees: Electronics and Telecommunications Research Institute, Daejeon (KR); Samsung Electronics Co., Ltd., Suwon-si (KR)

(*) Notice: Subject to any disclaimer, the term of this patent is extended or adjusted under 35 U.S.C. 154(b) by 1109 days.

(21) Appl. No.: 12/447,104

(22) PCT Filed: May 3, 2007

(86) PCT No.: PCT/KR2007/002186
§ 371 (c)(1),
(2), (4) Date: Jan. 8, 2010

(87) PCT Pub. No.: WO2008/050940
PCT Pub. Date: May 2, 2008

(65) Prior Publication Data
US 2010/0118744 A1    May 13, 2010

(30) Foreign Application Priority Data
Oct. 26, 2006  (KR) .................... 10-2006-0104432

(51) Int. Cl.
*H04B 7/005* (2006.01)
*H04B 7/00* (2006.01)
*H04J 3/00* (2006.01)
*H04J 1/00* (2006.01)

(52) U.S. Cl.
USPC ............ 370/278; 370/277; 370/280; 370/281

(58) Field of Classification Search
USPC .......... 370/280, 277, 278, 281; 455/78, 67.11
See application file for complete search history.

(56) References Cited

U.S. PATENT DOCUMENTS

| | | | | |
|---|---|---|---|---|
| 5,881,369 A | * | 3/1999 | Dean et al. | ........................ 455/78 |
| 5,890,056 A | * | 3/1999 | Garner et al. | ............... 455/67.11 |
| 5,926,466 A | * | 7/1999 | Ishida et al. | ................... 370/280 |
| 6,130,897 A | | 10/2000 | Ishida et al. | |
| 2005/0107115 A1 | | 5/2005 | Wu | |
| 2007/0243832 A1 | | 10/2007 | Park et al. | |

FOREIGN PATENT DOCUMENTS

| EP | 0 829 970 A2 | 3/1998 |
|---|---|---|
| KR | 10-1996-0043624 A | 12/1996 |
| KR | 10-1999-0047207 A | 7/1999 |

(Continued)

*Primary Examiner* — Mark Rinehart
*Assistant Examiner* — Gbemileke Onamuti
(74) *Attorney, Agent, or Firm* — Jefferson IP Law, LLP

(57) ABSTRACT

The present invention relates to a wireless transceiver system for supporting a dual mode that simultaneously supports the Frequency Division Duplex (FDD) method and the Time Division Duplex (TDD) method in a certain frequency band. The present system supports the FDD system conducting transmission and reception simultaneously by using different frequency bands for transmission and reception as well as the TDD system temporally alternating transmission and reception by using the common frequency band among an upper frequency band and a lower frequency band used in the FDD system as well as another frequency band adjacent thereto, thereby selectively supporting both of the two communication systems in a wireless transceiver system.

25 Claims, 10 Drawing Sheets

(56) References Cited

FOREIGN PATENT DOCUMENTS

| KR | 10-2000-0014350 A | 3/2000 |
| KR | 10-2001-0004621 A | 1/2001 |
| KR | 10-2004-0078699 A | 9/2004 |
| KR | 10-2006-0063547 A | 6/2006 |

* cited by examiner

WIRELESS TRANSCEIVER SYSTEM FOR SUPPORTING DUAL MODE

TECHNICAL FIELD

The present invention relates to a wireless transceiver system, and more particularly, to a wireless transceiver system for supporting a dual mode that simultaneously supports the Frequency Division Duplex (FDD) system and the Time Division Duplex (TDD) system in a certain frequency band.

BACKGROUND ART

Generally, a terminal has different front-end configurations, respectively, according to a communication system determined when communicating with a base station, namely, the TDD system and the FDD system.

FIG. 1 is a general schematic diagram of a wireless transceiver system wherein the prior TDD system is applied.

As shown in FIG. 1, a TDD wireless transceiver system includes a modem 11, a first low pass filter 12, a local oscillator 13, a first mixer 14, a first band-pass filter 15, a power amplifier 16, a selecting switch 17, a second band-pass filter 18, and an antenna Ant, thereby constituting a transmission signal processing unit.

Also, the TDD wireless transceiver system includes an antenna Ant, a second band-pass filter 18, a selecting switch 17, a low-noise amplifier 19, a third band-pass filter 20, a second mixer 21, a local oscillator 22, and a second low pass filter 22, thereby constituting a reception signal processing unit.

The TDD system in the wireless transceiver system according to the prior art illustrated in FIG. 1 divides time so that transmission and reception of signals are alternately performed, wherein a single antenna is used, and a switch or a circulator is used for time-dividedly choosing between transmission and reception. Furthermore, one local oscillator is used because the same frequency band is used when transmitting and receiving signals.

FIG. 2 is a general schematic diagram of a wireless transceiver system wherein the prior FDD system is applied.

As shown in FIG. 2, a wireless transceiver system using the prior FDD system includes a first low pass filter 32, a first local oscillator 33, a first mixer 34, a first band-pass filter 35, a power amplifier 36, a duplexer 37, and an antenna Ant, thereby constituting a transmission signal processing unit.

Also, the wireless transceiver system using the prior FDD system includes an antenna Ant, a duplexer 37, a low-noise amplifier 38, a second band-pass filter 39, a second local oscillator 40, a second mixer 41, and a second low pass filter 42, thereby constituting a reception signal processing unit.

The FDD system in the wireless transceiver system according to the prior art illustrated in FIG. 2 uses two distinct frequencies for transmission and reception of signals, for which two different local oscillators, a transmission local oscillator and a reception local oscillator, are adopted. Therefore, in terms of time, transmission and reception are carried out simultaneously, and frequencies are divided into a transmission frequency and a reception frequency using a duplexer, which is a filter of a frequency band, and a signal of the transmission frequency is transmitted through the antenna while a signal of the reception frequency is received.

According to the various next generation wireless communication standards provided at present, they are developing independently for the two communication systems described above, and they prescribe that different frequency bands should be used for the respective systems. This is for extensively taking advantage of the merit of efficient use of the limited frequency resource of the TDD system and the merit of transmitting more data per hour of the FDD system, and one or both of the two systems may be selectively adopted and used according to the standards. Also, according to the standards, an advantageous communication system may be selected considering the limited frequency resource as the case may be.

In order to support the TDD system and the FDD system described above in a wireless transceiver system, a scheme that includes both the configuration supporting the TDD system illustrated in FIG. 1 and the configuration supporting the FDD system illustrated in FIG. 2 at a front-end of the wireless transceiver system and selectively uses them has been suggested.

However, this is practically difficult to employ because two transmitting/receiving apparatuses are required at the front-end of a wireless transceiver system, which causes the system to be relatively too large.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to solve the above-described problem.

Technical Solution

According to an aspect of the invention, a wireless transceiver system having advantages of supporting the FDD system is provided. Also, a wireless transceiver system supporting the TDD system by selecting the desired frequency band among upper and lower frequency bands used in the FDD system as well as a frequency band between them or another adjacent frequency band, thereby supporting both communication systems of the FDD system and the TDD system in a wireless transceiver system is provided.

Advantageous Effects

According to the configuration described above, the present invention provides simplification of a system configuration by supporting the TDD system with an upper frequency band and a lower frequency band used in the FDD system or an arbitrary frequency band adjacent to the upper frequency band and the lower frequency band.

Also, the present invention provides a dual mode RF front-end simultaneously supporting the TDD system and the FDD system presented by the mobile communication standard, thereby providing an efficient use of the various wireless communication standards and the limited frequency resource, and on this basis, an efficient application of all wireless transceiver systems adopting the TDD system and the FDD system as well as the mobile communication base station and the terminal is provided.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Also, the drawings and description are to be regarded as illustrative in nature and not restrictive.

Also, when an element is referred to as "including" a constituent element, other constituent elements may be further included not excluded unless there is any other particular mention on it.

Now, a wireless transceiver system for supporting dual mode according to the first exemplary embodiment of the present invention will be described in detail with reference to the drawings.

Figure 1:
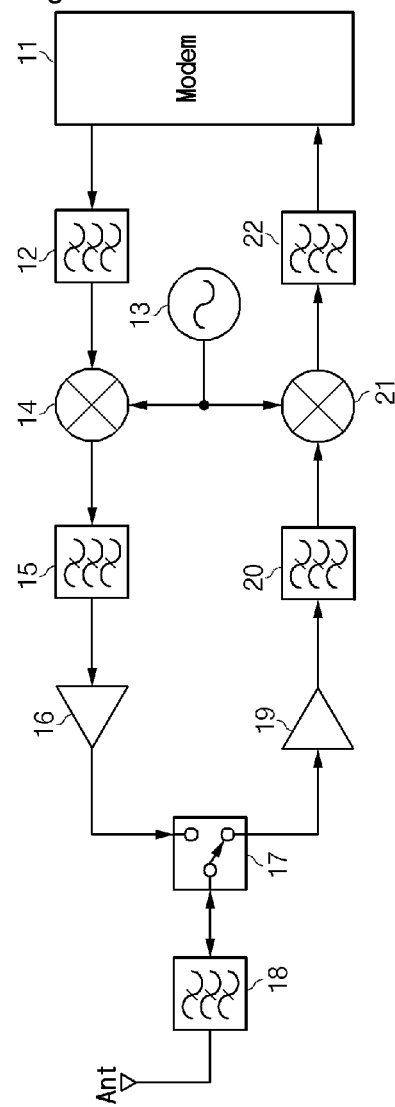
FIG. 1 is a general schematic diagram of a wireless transceiver system wherein the prior TDD system is applied.
Figure 2:
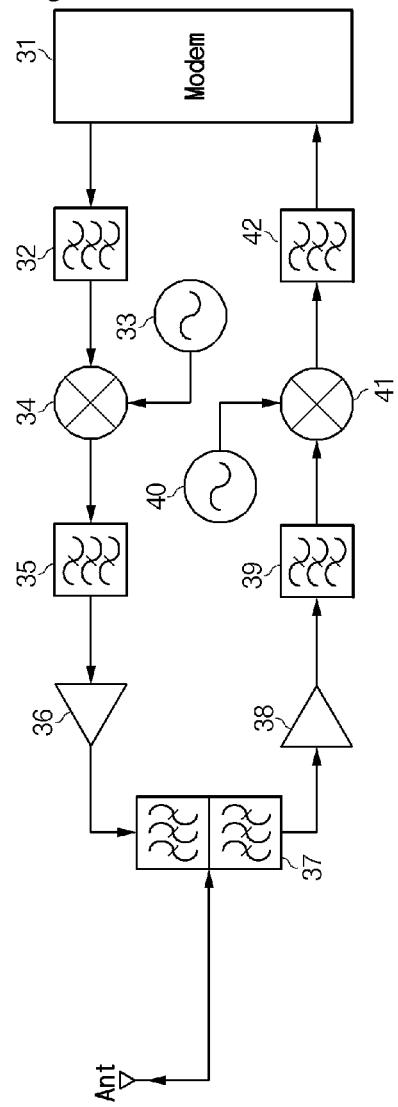
FIG. 2 is a general schematic diagram of a wireless transceiver system wherein the prior FDD system is applied.
Figure 3:
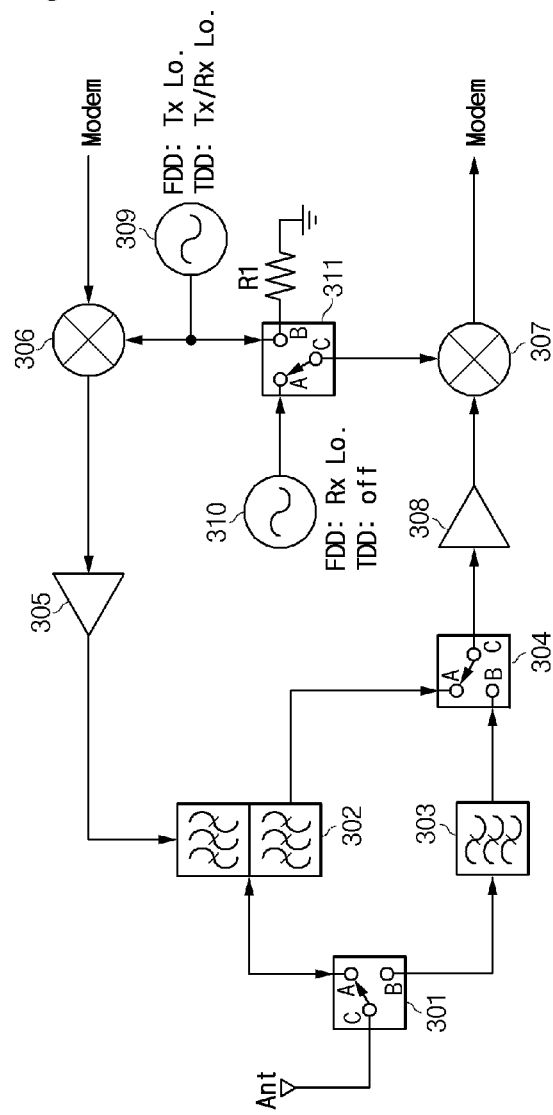
FIG. 3 is a schematic diagram of a wireless transceiver system for supporting dual mode according to the first exemplary embodiment of the present invention.

FIG. 3 is a schematic diagram of a wireless transceiver system for supporting dual mode according to the first exemplary embodiment of the present invention, which uses the transmission frequency of the FDD system for the TDD system, thereby supporting dual mode.

As shown in FIG. 3, a wireless transceiver system for supporting dual mode according to the first exemplary embodiment of the present invention includes a first selecting switch 301, a duplexer 302, a power amplifier 305, a first mixer 306, and a first local oscillator 309 to thereby constitute a transmission signal processing unit, and also includes the first selecting switch 301, the duplexer 302, a band-pass filter 303, a second selecting switch 304, a low-noise amplifier 308, a second mixer 307, a second local oscillator 310, a third selecting switch 311, and the first local oscillator 309 to thereby constitute a reception signal processing unit.

The first local oscillator 309 oscillates a transmission frequency for converting a transmission signal into a radio frequency (RF) signal in response to control of a control element (not shown) when the system is operated by means of the FDD system. Also, the first local oscillator 309 oscillates a transmission/reception frequency for converting a transmission signal into a RF signal and a received RF signal into an intermediate frequency (IF) or a baseband signal when the system is operated by means of the TDD system.

The first mixer 306 mixes an applied transmission signal that was modulated at a modem (not shown) with the oscillation frequency applied from the first local oscillator 309 to output a RF signal.

The power amplifier 305 power-amplifies the transmission signal, which was converted into a RF signal by the first mixer 306, into a predetermined level and outputs it.

The duplexer 302 transmits the applied transmission signal that was power-amplified at the power amplifier 305 to the antenna Ant via the contact points of the first selecting switch 301, and in the FDD mode, the duplexer 302 extracts the reception signal and applies it to the low-noise amplifier 308 via the second selecting switch 304.

The first selecting switch 301, which is connected between the duplexer 302 and the antenna Ant, selects a transmitting/receiving path of signals according to the employed communication system by switching the inner contact point in response to control of a control element (not shown).

The first selecting switch 301 connects the antenna Ant and the duplexer 302 to the transmitting/receiving path of signals by connecting the inner contact points "C" and "A" to each other when the system is operated by means of the FDD system. Also, when the system is operated by means of the TDD system, the inner contact points "C" and "A" are connected to each other so that a transmission signal from the duplexer 302 is transmitted through the antenna Ant in a transmission mode, while the inner contact points are switched to "C" and "B" so that a reception signal impedance-matched and received at the antenna Ant is applied to the band-pass filter 303 in a reception mode.

The band-pass filter 303 extracts only the desired band by filtering the reception signal received from the antenna Ant via the contact points "C" and "B" of the first selecting switch 301 so that only a predetermined band could pass through when the system is operated by means of the TDD system.

The inner contact points of the second selecting switch 304 are switched in response to control of a control element (not shown) according to the employed communication system, so that a receiving path of a signal is determined. The contact points of the second selecting switch 304 "C" and "A" are connected to each other so that a signal received through the duplexer 302 is transmitted to the low-noise amplifier 308 when the system is operated by means of the FDD system, while the contact points "C" and "B" are connected to each other so that a reception signal extracted by the band-pass filter 303 is transmitted to the low-noise amplifier 308 in the TDD system.

The low-noise amplifier 308 low-noise amplifies the reception signal applied through the contact points of the second selecting switch 304, according to the employed communication system, into a predetermined level and applies it to the second mixer 307.

The second local oscillator 310 oscillates a reception frequency in response to control of a control element (not shown) in the FDD system, while it is turned off not performing oscillation in the TDD system, thereby preventing mutual interference of adjacent signals.

The inner contact point of the third selecting switch 311 is switched in response to control of a control element (not shown) according to the employed communication system so that an oscillation frequency from the first local oscillator 309 or the second local oscillator 310 is applied to the second mixer 307.

The inner contact points "C" and "A" of the third selecting switch 311 are connected to each other so that an oscillation frequency outputted from the second local oscillator 310 is applied to the second mixer 307 when the system is operated by means of the FDD system. Also, when the system is operated by means of the TDD system, the inner contact points "C" and "B" are connected to each other so that an oscillation frequency outputted from the first local oscillator 309 is applied to the second mixer 307. When the inner contact points "C" and "A" of the third selecting switch 311 are connected to each other as the system is operated by means of the FDD system, a load compensating resistor R1 is connected to the inner contact point "B" of the third selecting switch 311 in order to prevent the load of the first local oscillator 309 from being changed due to the third selecting switch 311. In other words, the resistor R1 is used to prevent a performance change of the first local oscillator 309 as a result of a load change, and its preferable value is 50Ω.

When the system is operated by means of the FDD system, the second mixer 307 mixes the reception signal applied through the low-noise amplifier 308 with the oscillation frequency applied from the second local oscillator 310 to extract an IF or a baseband signal, which are then provided to a modem so that demodulation of the reception signal and the following post-process can be performed.

When the system is operated by means of the TDD system, the second mixer 307 mixes the reception signal applied through the low-noise amplifier 308 with the oscillation frequency applied from the first local oscillator 309 to extract an IF, which is then provided to a modem so that demodulation of the reception signal and the following post-process can be performed.

In FIG. 3, the operation of the first to the third selecting switches 301, 304, and 311 is illustrated according to an exemplary embodiment when the system is operated by means of the FDD system, wherein the selected inner contact points of the first to the third selecting switches 301, 304, and 311 are all "C" and "A".

The rough operation of the exemplary embodiment of the present invention configured as FIG. 3 is performed as follows.

First, when the system is operated by means of the FDD system, the inner contact points "C" and "A" of the first to the third selecting switches 301, 304, and 311 are connected to each other. Accordingly, the first mixer 306 converts an applied transmission signal that was modulated at a modem into a RF signal according to the frequency of the first local oscillator 309, and then, the RF signal is power-amplified into a predetermined level by the power amplifier 305, applied to the duplexer 302, and then transmitted through the antenna Ant via the contact points of the first selecting switch 301 by the duplexer 302. Also, a reception signal received through the antenna Ant is applied to the duplexer 302 via the contact points of the first selecting switch 301, and the duplexer 302 applies the reception signal to the low-noise amplifier 308 via the contact points of the second selecting switch 304, and then, the reception signal is low-noise amplified to be applied to the second mixer 307. At this time, the second mixer 307 extracts an IF or a baseband signal from the reception signal using the frequency applied from the second local oscillator 310 and provides it to a modem.

On the contrary, when the system is operated by means of the TDD system, the contact points "C" and "A" of the first selecting switch 301 are selected in a transmission mode, while the contact points "C" and "B" of the first selecting switch 301 are selected, and the contact points "C" and "A" of the second selecting switch 304 and the third selecting switch 311 are connected to each other in a reception mode.

Accordingly, the first mixer 306 converts an applied transmission signal that was modulated at a modem into a RF signal according to the frequency of the first local oscillator 309, which is power-amplified into a predetermined level by the power amplifier 305, applied to the duplexer 302, and then, transmitted to the antenna Ant via the contact points of the first selecting switch 301 by the duplexer 302. Also, a reception signal received through the antenna Ant is applied to the band-pass filter 303 via the contact points "C" and "B" of the first selecting switch 301, and from the reception signal, a frequency in the desired band is extracted by filtering at the band-pass filter 303, and then, the reception signal is applied to the low-noise amplifier 308 via the contact points of the second selecting switch 304 and low-noise amplified to be applied to the second mixer 307. At this time, the second mixer 307 extracts an IF or a baseband signal from the reception signal using a frequency oscillated at the first local oscillator 309 for frequency modulation in the FDD system and applied via the contact points "C" and "B" of the third selecting switch 311, and provides the extracted IF or baseband signal to a modem.

Figure 4:
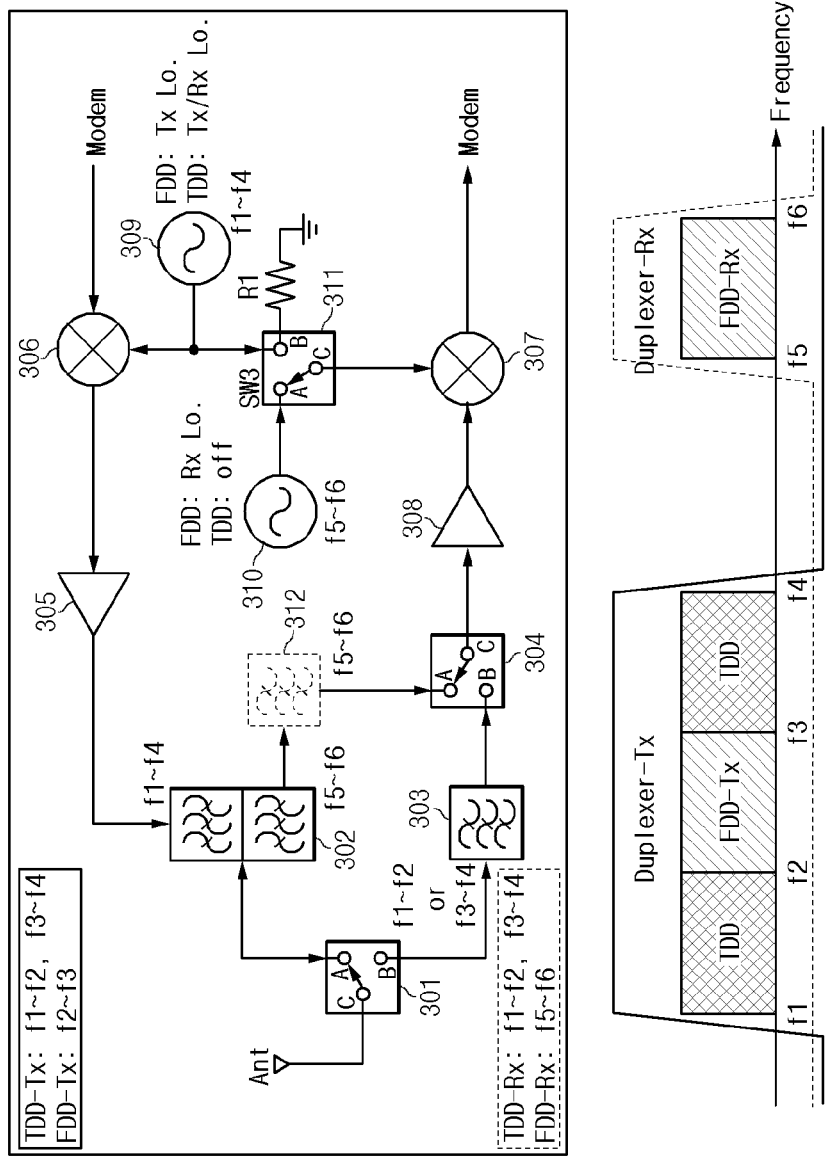
FIG. 4 is a schematic diagram illustrating the first operation example of a wireless transceiver system for supporting dual mode according to the first exemplary embodiment of the present invention.

FIG. 4 is a schematic diagram illustrating the first operation example of a wireless transceiver system for supporting dual mode according to the first exemplary embodiment of the present invention.

The first operation example shown in FIG. 4 is an exemplary embodiment wherein the lower frequency of the FDD system is set to a transmission frequency, and the predetermined transmission frequency or its adjacent frequency band is used in the TDD system, thereby supporting the TDD system and the FDD system.

Since the general operational relationship according to the employment of the TDD system or the FDD system is the same as or similar to the above description with reference to FIG. 3, its detailed description will be omitted here.

With reference to the FDD system, the transmission frequency band is set to the range of f1-f4, which is the lower frequency band, and the reception frequency band is set to the range of f5-f6, which is the upper frequency band, and the range of f1-f2 or f3-f4, which is in the lower frequency band.

For this purpose, the first local oscillator 309 is configured to oscillate a frequency having the range of f1-f4 in the lower frequency band, and the second local oscillator 310 is configured to oscillate a frequency having the range of f5-f6 in the upper frequency band.

When the system is operated by means of the TDD system, in a transmission mode, a transmission signal in the range of f1-f2 or f3-f4 which was converted into a RF signal at the first mixer 306 is determined to be a frequency in the range of f1-f4 by the transmitting-end of the duplexer 302 and then transmitted through the antenna Ant.

Also, in a reception mode, the band-pass filter 303 extracts a band of the range of f1-f2 or f3-f4 from a reception signal received through the antenna Ant., and the reception signal is applied to the second mixer 307 to be restored to a baseband signal.

When the system is operated by means of the FDD system, the contact point "C" is connected to the contact point and "A" of the first and the second switches 301 and 304, so that both transmission and reception of signals are performed through the path including the duplexer 302. Also, if necessary, an additional second band-pass filter 312 for extracting a frequency only in the desired band from a reception signal may be further included, thereby improving the frequency selectivity to completely remove a signal in the undesired frequency band. The contact point "C" is connected to the contact point "A" in the third selecting switch 311.

Consequently, a transmission signal in the range of f2-f3 that was converted into a RF signal at the first mixer 306 is determined to be a frequency in the range of f1-f4 by the transmitting-end of the duplexer 302 and then transmitted through the antenna Ant.

Also, a reception signal received through the antenna Ant is determined to be a frequency in the range of f5-f6 by the duplexer 302 and applied to the additionally installed band-pass filter 312. Therefore, the second band-pass filter 312 performs band-pass filtering of the reception signal so that a signal in the f5-f6 band of the upper frequency band is extracted and applied to the second mixer 307 to be extracted as a baseband signal.

Figure 5:
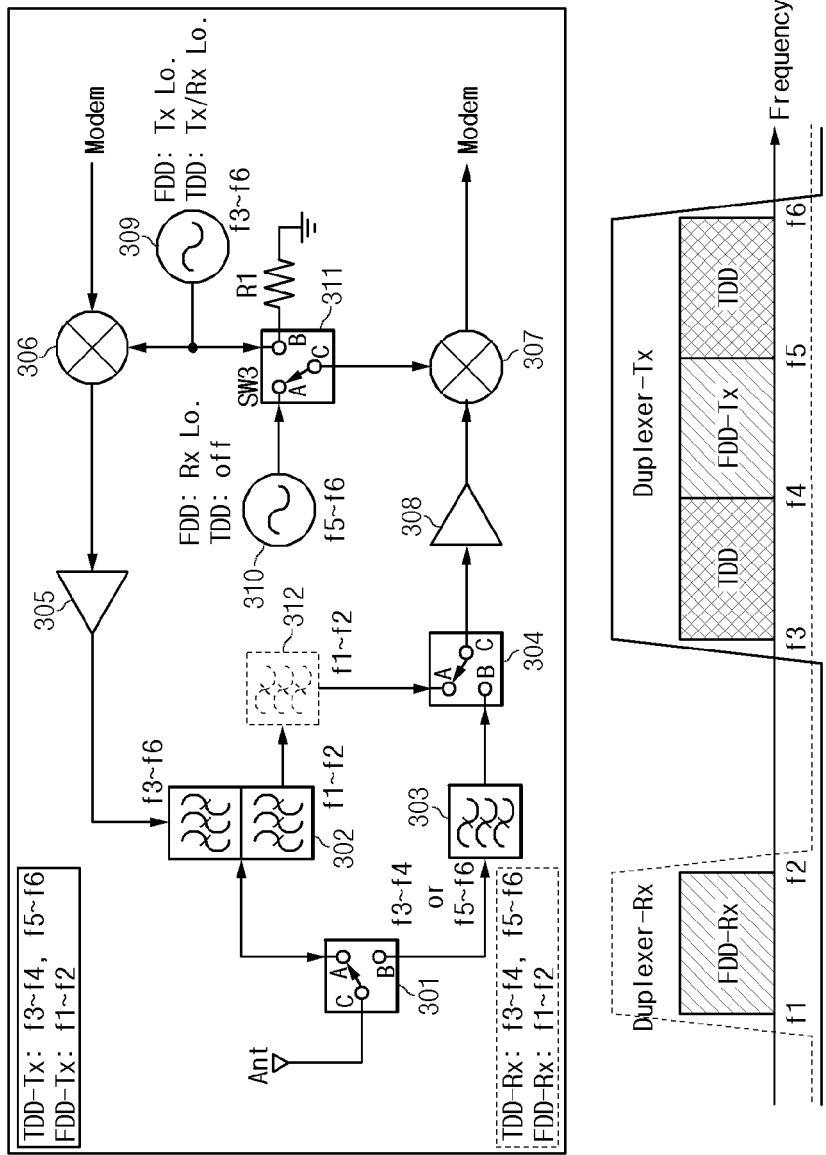
FIG. 5 is a schematic diagram illustrating the second operation example of a wireless transceiver system for supporting dual mode according to the first exemplary embodiment of the present invention.

FIG. 5 is a schematic diagram illustrating the second operation example of a wireless transceiver system for supporting dual mode according to the first exemplary embodiment of the present invention.

The second operation example of the first exemplary embodiment shown in FIG. 5 is an exemplary embodiment wherein the upper frequency band of the FDD system is set to a transmission frequency band, and the predetermined transmission frequency band or its adjacent frequency band is used in the TDD system, thereby supporting the TDD system and the FDD system.

With reference to the FDD system, the transmission frequency band is set to the range of f3 f6, which is the upper frequency band, and the reception frequency band is set to the range of f1-f2, which is the lower frequency band, and the range of f3-f4 or f5-f6, which is in the upper frequency band.

For this purpose, the first local oscillator 309 is configured to oscillate a frequency having the range of f3-f6 in the upper frequency band, and the second local oscillator 310 is configured to oscillate a frequency having the range of f1-f2 in the lower frequency band.

When the system is operated by means of the TDD system, in a transmission mode, a transmission signal in the range of f3-f4 or f5-f6 which was converted into a RF signal at the first mixer 306 is determined to be a frequency in the range of f3-f6 by the transmitting-end of the duplexer 302 and then transmitted through the antenna Ant.

Also, in a reception mode, the band-pass filter 303 extracts a band in the range of f3-f4 or f5-f6 from a reception signal received through the antenna Ant., and the reception signal is applied to the second mixer 307 to be restored to a baseband signal.

When the system is operated by means of the FDD system, a transmission signal in the range of f4 f5 that was converted into a RF signal at the first mixer 306 is determined to be a frequency in the range of f3 f6 by the transmitting-end of the duplexer 302 and then transmitted through the antenna Ant.

Also, a reception signal received through the antenna Ant is determined to be a frequency in the range of f1 f2 by the duplexer 302 and applied to the additionally installed second band-pass filter 312. Therefore, the second band-pass filter 312 performs band-pass filtering of the reception signal so that a signal in the f1-f2 band, which is the lower frequency band, is extracted and applied to the second mixer 307 to be extracted as a baseband signal.

Figure 6:
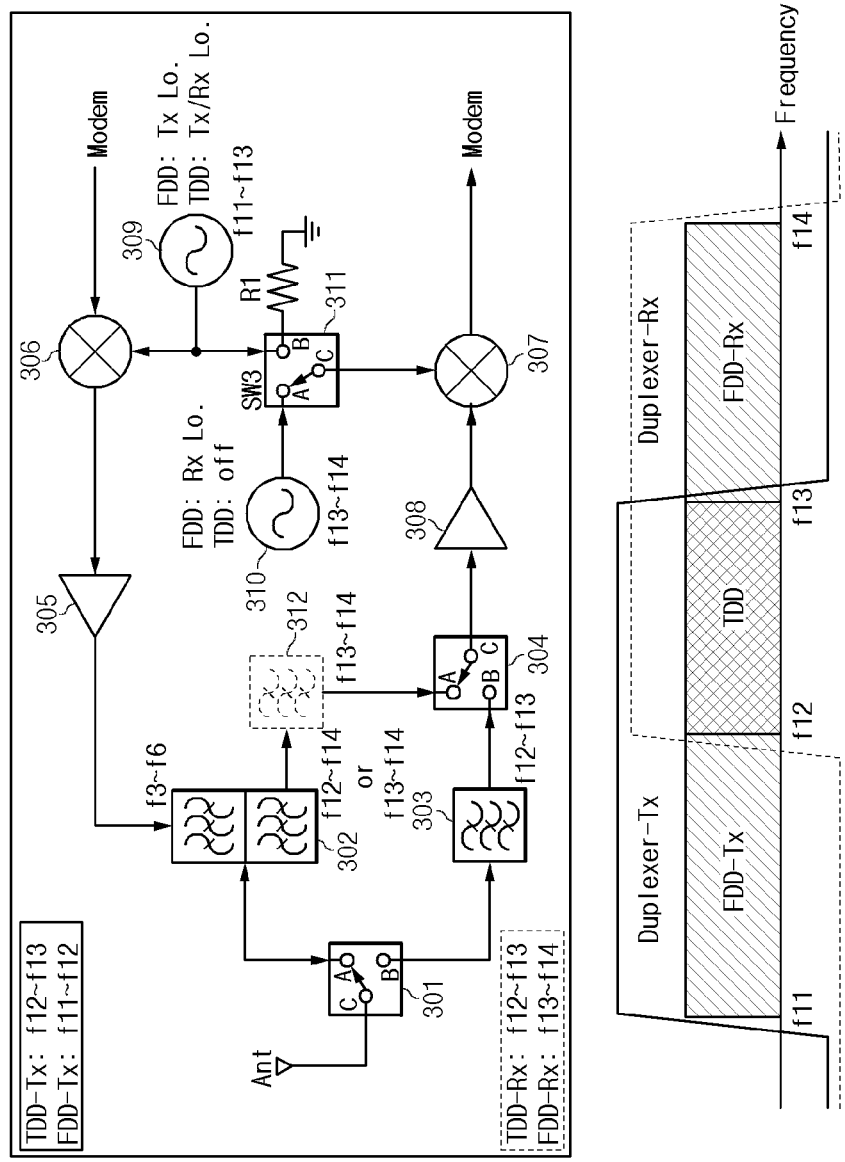
FIG. 6 is a schematic diagram illustrating the third operation example of a wireless transceiver system for supporting dual mode according to the first exemplary embodiment of the present invention.

FIG. 6 is a schematic diagram illustrating the third operation example of a wireless transceiver system for supporting dual mode according to the first exemplary embodiment of the present invention.

The third operation example of the first exemplary embodiment shown in FIG. 6 is an exemplary embodiment wherein the upper frequency band of the FDD system is set to a reception frequency, while the lower frequency band of the FDD system is set to a transmission frequency, and the band between the upper frequency band and the lower frequency band is used in the TDD system, thereby selectively supporting the TDD system and the FDD system.

With reference to the FDD system, the transmission frequency band is set to the range of f11-f13, which is the lower frequency band, and the reception frequency band is set to the range of f13-f14, which is the upper frequency band.

For this purpose, the first local oscillator 309 is configured to oscillate a frequency having the range of f11-f13 in the lower frequency band, and the second local oscillator 310 is configured to oscillate a frequency having the range of f13-f14 in the upper frequency band.

In this configuration, the f12-f13 range is used for transmitting/receiving in the TDD system, while the lower frequency band, f11-f12, is used as a transmission frequency, and the upper frequency band, f13-f14, is used as a reception frequency in the FDD system.

When the system is operated by means of the TDD system, in a transmission mode, a transmission signal in the range of f12-f13 which was converted into a RF signal at the first mixer 306 is determined to be a frequency in the range of f11-f13 by the transmitting-end of the duplexer 302 and then transmitted through the antenna Ant.

Also, in a reception mode, the band-pass filter 303 extracts a band in the range of f12-f13 from a reception signal received through the antenna Ant., and the reception signal is applied to the second mixer 307 to be restored to an IF.

When the system is operated by means of the FDD system, a transmission signal in the range of f11-f12 that was converted into a RF signal at the first mixer 306 is determined to be a frequency in the range of f11-f13 by the transmitting-end of the duplexer 302 and then transmitted through the antenna Ant.

Also, a reception signal received through the antenna Ant is determined to be a frequency in the range of f12-f14 by the duplexer 302 and applied to the additionally installed second band-pass filter 312. Therefore, the second band-pass filter 312 performs band-pass filtering of the reception signal so that a signal in the f13-f14 band, which is the upper frequency band, is extracted and applied to the second mixer 307 to be extracted as a baseband signal.

Figure 7:
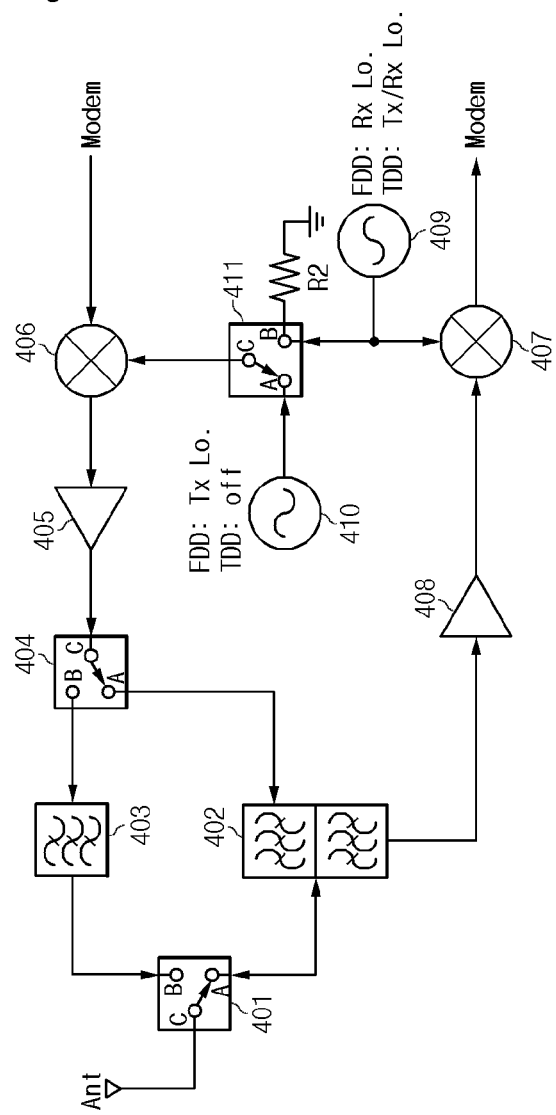
FIG. 7 is a schematic diagram of a wireless transceiver system for supporting dual mode according to the second exemplary embodiment of the present invention.

FIG. 7 is a schematic diagram of a wireless transceiver system for supporting dual mode according to the second exemplary embodiment of the present invention, which uses a reception frequency of the FDD system for the TDD communication, thereby supporting dual mode.

As shown in FIG. 7, a wireless transceiver system for supporting dual mode according to the second exemplary embodiment of the present invention includes a first selecting switch 401, a duplexer 402, a band-pass filter 403, a second selecting switch 404, a power amplifier 405, and a first mixer 406 to thereby constitute a transmission signal processing unit.

Also, it includes the first selecting switch 401, the duplexer 402, a low-noise amplifier 408, and a second mixer 407 to thereby constitute a reception signal processing unit. Additionally, a first local oscillator 410 and a second local oscillator 409, which oscillate frequencies for transmission and reception of signals when the system is operated by means of the FDD system or the TDD system, are further included.

The first local oscillator 410 oscillates a transmission frequency for converting a transmission signal into a RF signal in response to control of a control element (not shown) when the system is operated by means of the FDD system. The first local oscillator 410 oscillates a transmission frequency for converting a transmission signal into a RF signal only when the system is operated by means of the FDD system, while it is turned off not performing oscillation when the system is operated by means of the TDD system, thereby preventing mutual interference of adjacent signals.

The first mixer 406 mixes an applied transmission signal that was modulated at a modem (not shown) with an oscillation frequency applied from the first local oscillator 410 to output a RF signal.

The power amplifier 405 power amplifies the transmission signal, which was converted into a RF signal by the first mixer 406, into a predetermined level and outputs it.

The inner contact points of the second selecting switch 404 are switched in response to control of a control element (not shown) according to an employed communication system, so that a transmitting path of a signal is determined. The inner contact points "C" and "A" of the second selecting switch 404 are connected to each other so that a power-amplified transmission signal can be provided to the duplexer 402 when the system is operated by means of the FDD system. Also, when the system is operated by means of the TDD system, the inner contact points "C" and "B" of the second selecting switch 404 are connected to each other so that a power-amplified transmission signal can be provided to the band-pass filter 403.

In the TDD system, the band-pass filter 403 extracts only the desired frequency band by filtering a power-amplified transmission signal applied via the contact points "C" and "B" of the second selecting switch 404 into a predetermined band, and then transmits it to the antenna Ant via the contact points of the first selecting switch 401 used in the TDD system. Accordingly, in the TDD system, a reception frequency of the FDD system or an arbitrary frequency band adjacent thereto may be used as an oscillation frequency of the TDD system.

The duplexer 402 transmits a power-amplified transmission signal applied through the second selecting switch 404 to the antenna Ant via the contact points of the first selecting switch 401 when the system is operated by means of the FDD system. Also, the duplexer 402 performs a reception process of a reception signal received through the contact points of the first selecting switch 401 to provide it to the low-noise amplifier 408 no matter whether the system is operated by means of the FDD system or the TDD system.

The first selecting switch 401, which is connected between the duplexer 302 and the antenna Ant, selects a transmitting/receiving path of a signal according to the employed communication system by switching the inner contact point in response to control of a control element (not shown). The first selecting switch 401 connects the antenna Ant and the duplexer 402 to the transmitting/receiving path of a signal by connecting the inner contact points "C" and "A" to each other when the system is operated by means of the FDD system. Also, when the system is operated by means of the TDD system, the inner contact points "C" and "B" are connected to each other so that a transmission signal filtered by the band-pass filter 403 is transmitted through the antenna Ant in a transmission mode, while the inner contact points are switched to "C" and "A" so that a reception signal received through the antenna Ant is applied to the duplexer 402 in a reception mode.

The low-noise amplifier 408 low-noise amplifies a reception signal, which is applied after being processed at the duplexer 402, into a predetermined level and applies it to the second mixer 407.

The second local oscillator 409 oscillates a reception frequency in response to control of a control element (not shown) in the FDD system and oscillates a transmission/reception frequency in the TDD system.

The inner contact points "C" and "A" of the third selecting switch 411 are connected to each other so that an oscillation frequency outputted from the first local oscillator 410 is applied to the first mixer 406 when the system is operated by means of the FDD system. Also, when the system is operated by means of the TDD system, the inner contact points "C" and "B" are connected to each other so that an oscillation frequency outputted from the second local oscillator 409 is applied to the first mixer 406 and the second mixer 407. When the inner contact points "C" and "A" of the third selecting switch 411 are connected to each other as the system is operated by means of the FDD system, a load compensating resistor R2 is connected to the inner contact point B of the third selecting switch 411 in order to prevent the load of the second local oscillator 409 from being changed due to the third selecting switch 411. The resistor R2 is used to prevent a performance change of the second local oscillator 409 as a result of a load change caused by a switching operation of the third selecting switch 411, and its preferable value is 50Ω.

When the system is operated by means of the FDD system, the second mixer 407 mixes a reception signal applied through the low-noise amplifier 408 with an oscillation frequency applied from the second local oscillator 409 to extract an IF or a baseband signal, which are then provided to a modem so that demodulation of the reception signal and the following post-process can be performed.

In FIG. 7, the operation of the first to the third selecting switches 401, 404, and 411 is illustrated according to an exemplary embodiment when the system is operated by means of the FDD system, wherein the selected inner contact points of the first to the third selecting switches 401, 404, and 411 are all "C" and "A".

Therefore, the first selecting switch 401 selects a communication path connecting the antenna Ant and the duplexer 402, so that separate processes of a transmission signal and a reception signal are performed by the duplexer 402. Also, the second selecting switch 404 provides a power-amplified transmission signal to the transmitting-end of the duplexer 402. Also, by means of the third selecting switch 411, the oscillation frequency from the first local oscillator 410 is used for modulation of a transmission signal, and the oscillation frequency from the second local oscillator 409 is used for demodulation of a reception signal.

The rough operation of the present exemplary embodiment of the present invention configured as FIG. 7 is performed as follows.

First, when the system is operated by means of the FDD system, the inner contact points "C" and "A" of the first to the third selecting switches 401, 404, and 411 are connected to each other in response to control of a control element (not shown). The first mixer 406 converts a transmission signal modulated at a modem into a RF signal by mixing the transmission signal with a frequency of the first local oscillator 410, and the transmission signal is power-amplified into a predetermined level by the power amplifier 405 to be applied to the duplexer 402 via the contact points "C" and "A" of the second selecting switch 404. The duplexer 402 transmits the applied transmission signal to the antenna Ant via the contact points of the first selecting switch 401.

Also, a reception signal received through the antenna Ant is applied to the duplexer 402 via the contact points of the first selecting switch 401, and the duplexer 402 applies the reception signal to the low-noise amplifier 408 so that the reception signal is low-noise amplified and then applied to the second mixer 407. At this time, the second mixer 407 extracts an IF or a baseband signal from the reception signal using a frequency applied from the second local oscillator 409 and provides it to a modem.

However, when the system is operated by means of the TDD system, the contact points "C" and "B" of the first selecting switch 401 are connected to each other in a transmission mode, while the contact points "C" and "A" of the first selecting switch 401 are connected to each other in a reception mode. For the second selecting switch 404 and the third selecting switch 411, the contact points "C" and "B" are connected to each other. The first mixer 406 mixes an oscillation frequency of the second local oscillator 409, which oscillates a frequency to extract a reception signal in the FDD system, with an applied transmission signal that was modulated at a modem to convert the transmission signal into a RF signal, which is then power-amplified into a predetermined level by the power amplifier 405 and applied to the band-pass filter 403 via the contact points "C" and "B" of the second selecting switch 404. The band-pass filter 403 performs filtering of the power-amplified transmission signal to extract a signal in the desired band, which is transmitted through the antenna Ant via the contact points "C" and "B" of the first selecting switch 401.

Meanwhile, a reception signal received through the antenna Ant is applied to the duplexer 402 via the contact points "C" and "A" of the first selecting switch 401, and the duplexer 402 applies the reception signal to the low-noise amplifier 408 so that the reception signal is low-noise amplified and applied to the second mixer 407. At this time, the second mixer 407 generates an IF or a baseband signal from the reception signal using a frequency applied from the second local oscillator 409 and provides it to a modem.

Figure 8:
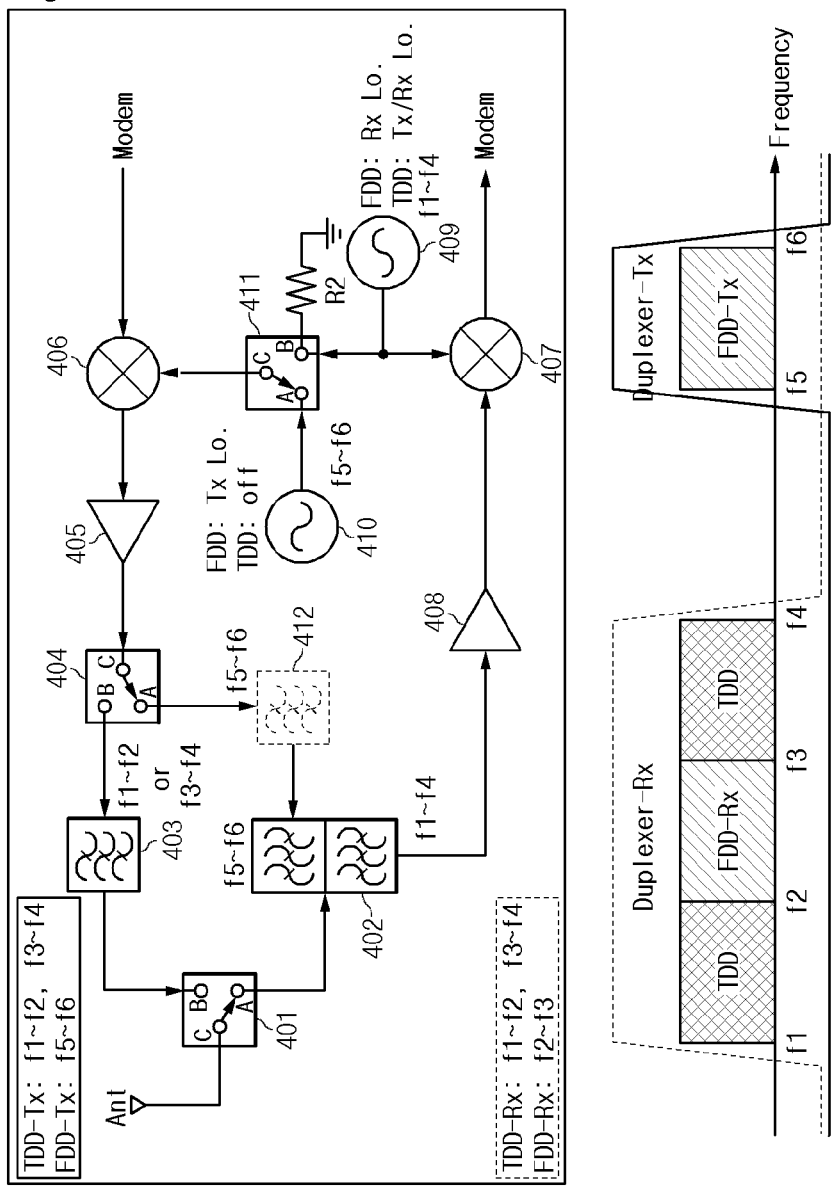
FIG. 8 is a schematic diagram illustrating the first operation example of a wireless transceiver system for supporting dual mode according to the second exemplary embodiment of the present invention.

FIG. 8 is a schematic diagram illustrating the first operation example of a wireless transceiver system for supporting dual mode according to the second exemplary embodiment of the present invention.

The first operation example according to the second exemplary embodiment of the present invention shown in FIG. 8 is an exemplary embodiment wherein the lower frequency band of the FDD system is set to a reception frequency band, and the upper frequency band of the FDD system is set to a transmission frequency band, while the predetermined reception frequency band or its adjacent frequency band is used in the TDD system, thereby supporting the TDD system and the FDD system.

Since the general operational relationship according to the employment of the TDD system or the FDD system is the same as or similar to the above description with reference to FIG. 7, its detailed description will be omitted here.

With reference to the FDD system, the transmission frequency band is set to the range of f5 f6 in the upper frequency band and the range of f1-f2 or f3-f4 in the lower frequency band, and the reception frequency band is set to the range of f1 f4 in the lower frequency band.

For this purpose, the first local oscillator 410 for generating a transmission frequency is configured to oscillate an oscillation frequency having the range of f5-f6 in the upper frequency band, and the second local oscillator 409 for generating a reception frequency is configured to oscillate an oscillation frequency having the range of f1-f4 in the lower frequency band.

When the system is operated by means of the TDD system, in a transmission mode, a transmission signal is mixed with a frequency in the range of f1-f2 or f3-f4, which is within the range of f1-f4 of the second local oscillator 409, at the first mixer 406 to be converted into a RF signal and applied to the band-pass filter 403. The band-pass filter 403 extracts only the frequency band in the range of f1-f2 or f3-f4 from a transmission RF signal and transmits it through the antenna Ant.

Also, in a reception mode, since the contact points "C" and "A" of the first selecting switch 401 are connected to each other, a signal having the range of f1-f4 in the lower frequency band is extracted from a reception signal received through the antenna Ant by the duplexer 402 and applied to the second mixer 407.

Since a single oscillation frequency is used in the TDD system, the second mixer 407 mixes a reception signal with the frequency in the range of f1-f2 or f3-f4 applied from the second local oscillator 409 to extract a baseband signal.

On the contrary, when the system is operated by means of the FDD system, the contact point "C" is connected to the contact point and "A" of the first, the second, and the third selecting switches 401, 404, and 411, so that both transmission and reception of a signal are performed through a path including the duplexer 402.

Also, if necessary, a second band-pass filter 412 for extracting a frequency only in the desired band from a transmission signal may be further added to the contact point and "A" of the second selecting switch 404, so that transmission only of the upper frequency band can be performed.

Therefore, an outputted transmission signal which was modulated at a modem is mixed with a frequency oscillated at the first local oscillator 410 having the range of f5-f6 in the upper frequency band by the first mixer 406 to be converted into a RF signal, and the transmission signal is power-amplified and provided to the second band-pass filter 412. Here, the second band-pass filter 412 extracts a frequency having the range of f5-f6 in the upper frequency band from a transmission signal and transmits it to the antenna Ant through the transmitting-end of the duplexer 402.

Also, a reception signal impedance-matched at the antenna Ant and received through the contact points of the first selecting switch 401 is determined to be in the frequency band having the range of f1-f4 in the lower frequency band by the duplexer 402, and the reception signal is low-noise amplified to be applied to the second mixer 408. Then, the second mixer 408 mixes the reception signal with the oscillation frequency in the range of f2-f3 of the lower frequency band generated at the second local oscillator 409 to extract a baseband signal.

Figure 9:
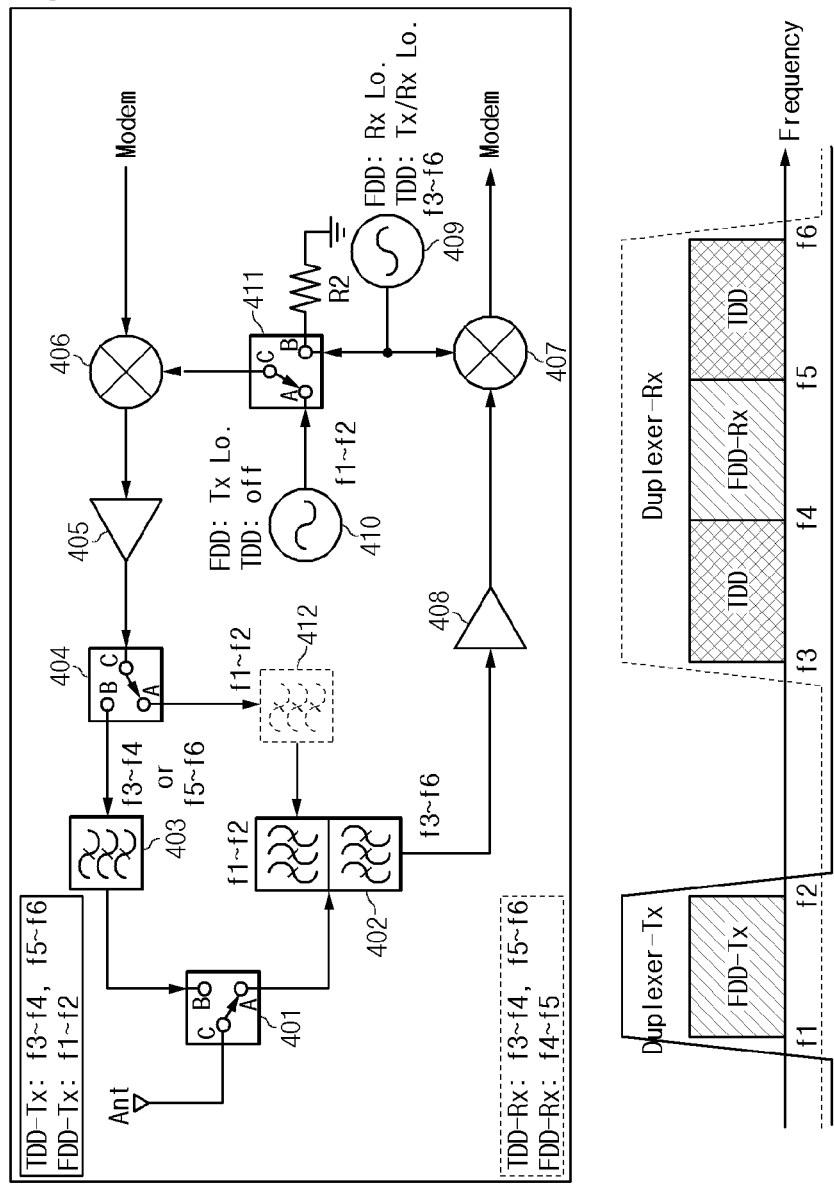
FIG. 9 is a schematic diagram illustrating the second operation example of a wireless transceiver system for supporting dual mode according to the second exemplary embodiment of the present invention.

FIG. 9 is a schematic diagram illustrating the second operation example of a wireless transceiver system for supporting dual mode according to the second exemplary embodiment of the present invention.

The second operation example according to the second exemplary embodiment of the present invention shown in FIG. 9 is an exemplary embodiment wherein the upper frequency band of the FDD system is set to a reception frequency band, and the lower frequency band of the FDD system is set to a transmission frequency band, while the predetermined reception frequency band or its adjacent frequency band is used in the TDD system, thereby supporting the TDD system and the FDD system.

With reference to the FDD system, the transmission frequency band is set to the range of f1 f2 in the lower frequency band and the range of f3 f4 or f5 f6 in the upper frequency band, and the reception frequency band is set to the range of f3 f6 in the upper frequency band.

For this purpose, the first local oscillator 410 is configured to oscillate a frequency having the range of f1 f2 in the lower frequency band, and the second local oscillator 409 is configured to oscillate a frequency having the range of f3 f6 in the upper frequency band.

When the system is operated by means of the TDD system, in a transmission mode, the band-pass filter 403 extracts a frequency band in the range of f3-f4 or f5-f6 from a RF signal modulated to be in the range of f3-f4 or f5-f6 by the first mixer 406 and the second local oscillator 409, and the extracted RF signal is transmitted through the antenna Ant.

Also, in a reception mode, a signal having the frequency range of f3-f6 in the upper frequency band is extracted from a reception signal impedance-matched and received at the antenna Ant by the duplexer 402 and then low-noise amplified to be applied to the second mixer 408.

Since a single oscillation frequency is used in the TDD system, the second mixer 407 mixes the reception signal with the frequency in the range of f3 f4 or f5 f6 in the upper frequency band applied from the second local oscillator 409, so that a baseband signal is extracted to be provided to a modem.

Also, when the system is operated by means of the FDD system, both transmitting and receiving paths of signals are configured to include the duplexer 402 in the path. Also, if necessary, a second band-pass filter 412 for extracting a frequency only in the desired range of f1-f2 from a transmission signal may be further added to the contact point A of the second selecting switch 404, so that only the lower frequency band can be extracted.

Therefore, a signal having the frequency range of f1-f2 in the lower frequency band is extracted, by the second band-pass filter 412, from a transmission signal mixed with an oscillation frequency in the f1-f2 frequency band of the first local oscillator 410 and converted into a RF signal at the first mixer 406, and transmitted through the antenna Ant via the transmitting-end of the duplexer 402.

Also, the duplexer 402 extracts a signal in the frequency band range of f3-f6 in the upper frequency band from a reception signal received through the antenna Ant, and then, the reception signal is low-noise amplified and applied to the second mixer 407 to extract a baseband signal.

Figure 10:
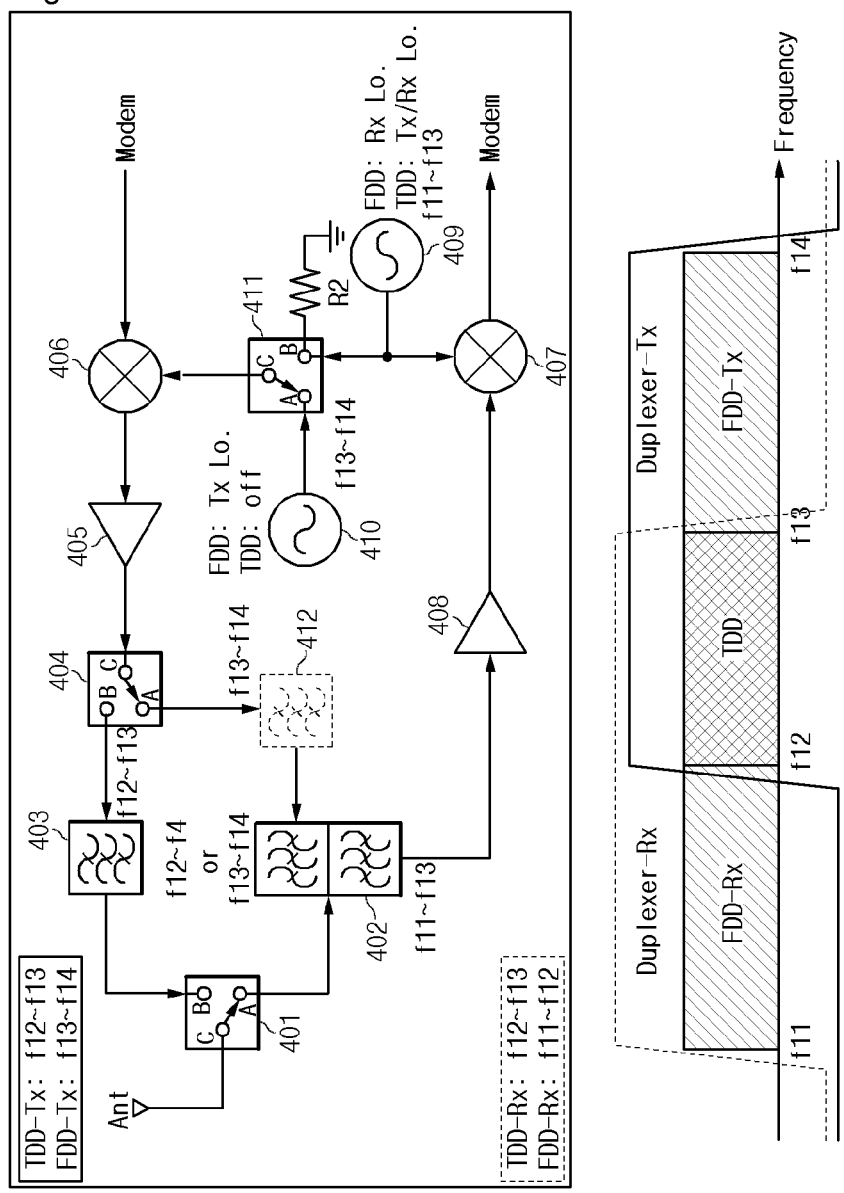
FIG. 10 is a schematic diagram illustrating the third operation example of a wireless transceiver system for supporting dual mode according to the second exemplary embodiment of the present invention.

FIG. 10 is a schematic diagram illustrating the third operation example of a wireless transceiver system for supporting dual mode according to the second exemplary embodiment of the present invention.

The third operation example of the second exemplary embodiment shown in FIG. 10 is an exemplary embodiment wherein the upper frequency band of the FDD system is set to a transmission frequency band, and the lower frequency band of the FDD system is set to a reception frequency band, while the band between the upper frequency band and the lower frequency band is used in the TDD system, thereby supporting the TDD system and the FDD system.

With reference to the FDD system, the transmission frequency band is set to the range of f12 f14 in the upper frequency band, and the reception frequency band is set to the range of f11 f13 in the lower frequency band. For this purpose, the first local oscillator 410 is configured to oscillate a frequency band having the range of f13-f14, and the second local oscillator 409 is configured to oscillate a frequency band in the range of f11-f13.

When the system is operated by means of the TDD system, in a transmission mode, the band-pass filter 403 extracts a frequency band in the range of f12 f13 from a RF signal modulated to have a frequency in the range of f11 f13 by the first mixer 406, and then, the transmission signal is transmitted through the antenna Ant.

Also, in a reception mode, a signal having the frequency range of f11 f13 in the lower frequency band is extracted from a reception signal impedance-matched and received at the antenna Ant by the duplexer 402 and then low-noise amplified to be applied to the second mixer 408. Since a single oscillation frequency is used in the TDD system, the second mixer 407 mixes the reception signal with a frequency in the range of f11 f13 in the lower frequency band applied from the second local oscillator 409, so that a baseband signal is extracted to be provided to a modem.

Also, when the system is operated by means of the FDD system, both transmitting and receiving paths of signals are configured to include the duplexer 402 in the path. Also, if necessary, a second band-pass filter 412 for extracting a frequency only in the desired range of f13 f14 from a transmission signal may be further added to the contact point A of the second selecting switch 404, so that only the upper frequency band can be extracted.

Therefore, a signal having the frequency range of f13 f14 is extracted, by the second band-pass filter 412, from a transmission signal mixed with an oscillation frequency in the f13 f14 frequency band of the first local oscillator 410 and converted into a RF signal at the first mixer 406, and applied to the transmitting-end of the duplexer 402. Then, the duplexer 402 determines the frequency of the transmission signal to be in the range of f12-f14 or f13-f14 and transmits it through the antenna Ant.

Also, a signal in the frequency band range of f11 f13 in the lower frequency band is extracted from a reception signal received through the antenna Ant by the duplexer 402, and then, the signal is low-noise amplified and applied to the second mixer 407 to be extracted as a baseband signal.

The above-described exemplary embodiments of the present invention are not embodied only through a method and an apparatus but also can be embodied through a program performing the function corresponding to the configuration of the exemplary embodiments of the present invention or a recording medium in which the program is recorded, and it is to be understood that this various embodiment can be easily accomplished on the basis of the above description of the exemplary embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A wireless transceiver system provided at a front-end of a system for supporting a dual mode, the wireless transceiver system comprising:
    a first selecting switch connected to an antenna transmitting/receiving a radio signal, the first selecting switch determining a transmitting/receiving path of a signal according to a communication system;
    a first mixer for converting a transmission signal on the basis of a first frequency;
    a duplexer for transmitting a transmission signal converted at the first mixer to the antenna via the first selecting switch and for receiving a reception signal received through the antenna via the first selecting switch in a first communication system;

a band-pass filter for receiving a reception signal, which is received through the antenna, via the first selecting switch, and extracting a signal in a predetermined frequency band from the reception signal in a second communication system;

a second selecting switch for selecting and outputting a reception signal received through the duplexer in the first communication system, and for selecting and outputting a reception signal, which does not pass through the duplexer, received through the first selecting switch in the second communication system;

a first local oscillator for oscillating a first frequency;

a second local oscillator for oscillating a second frequency; and a second mixer for converting a reception signal outputted from the second selecting switch on the basis of the first frequency from the first local oscillator selected from among the first and second local oscillators in the first communication system and for converting a reception signal outputted from the second selecting switch on the basis of the second frequency from the second local oscillator selected from among the first and second local oscillators in the second communication system.

2. The wireless transceiver system of claim 1, further comprising:

a third selecting switch for selecting one of the first local oscillator or the second local oscillator according to a communication system.

3. The wireless transceiver system of claim 2, wherein the first local oscillator oscillates only a transmission frequency in the first communication system and oscillates a transmission/reception frequency in the second communication system.

4. The wireless transceiver system of claim 2, wherein the second local oscillator oscillates a reception frequency in the first communication system and is turned off in the second communication system to prevent interference with the first local oscillator.

5. The wireless transceiver system of claim 2, wherein the first selecting switch selects and fixes a transmitting/receiving path between the antenna and the duplexer in the first communication system.

6. The wireless transceiver system of claim 2, wherein the first selecting switch selects one between the duplexer and the band-pass filter according to a transmission/reception mode of a signal in the second communication system to determine a path of a transmission/reception signal.

7. The wireless transceiver system of claim 2, wherein the third selecting switch provides the first frequency to the second mixer as a reception oscillation frequency in the second communication system and provides the second frequency to the second mixer as a reception oscillation frequency in the first communication system.

8. The wireless transceiver system of claim 2, wherein the third selecting switch includes a load compensating resistor as a terminating resistance connected to a contact point that is connected to the first local oscillator.

9. The wireless transceiver system of claim 2, wherein the first local oscillator is configured to oscillate a frequency in a first frequency band, and the second local oscillator is configured to oscillate a frequency in a second frequency band adjacent to the first frequency band, so that signal transmission/reception in the first communication system and signal transmission in the second communication system can be performed in the first frequency band, and signal reception in the second communication system can be performed in the second frequency band.

10. The wireless transceiver system of claim 9, wherein signal transmission/reception according to the first communication system and signal transmission according to the second communication system in the first frequency band are divided by the band-pass filter.

11. The wireless transceiver system of claim 9, further comprising an additional band-pass filter for extracting a signal having a frequency in the second frequency band from a signal outputted from a reception signal output end of the duplexer when the second communication system is employed.

12. The wireless transceiver system of claim 1, wherein the first communication system is a Frequency Division Duplex (FDD) system, and the second communication system is a Time Division Duplex (TDD) system.

13. The wireless transceiver system of claim 1, wherein the second selecting switch is connected to an output end of the duplexer in the first communication system and is connected to an output end of the band-pass filter in the second communication system so that demodulation of a reception signal can be performed.

14. A wireless transceiver system provided at a front-end of a system for supporting dual mode, the wireless transceiver system comprising:

a first selecting switch connected to an antenna transmitting/receiving a radio signal, the first selecting switch determining a transmitting/receiving path of a signal according to a communication system;

a first local oscillator for oscillating a first frequency;

a second local oscillator for oscillating a second frequency which is different from the first frequency;

a first mixer for converting a transmission signal on the basis of the first frequency from the first local oscillator selected from among the first and second local oscillators in a first communication system, and for converting a transmission signal on the basis of the second frequency from the second local oscillator selected from among the first and second local oscillators in a second communication system;

a second selecting switch for selecting a path of a transmission signal converted at the first mixer according to a communication system from among a plurality of transmission paths;

a duplexer for receiving a reception signal received through the antenna via the first selecting switch and for receiving a transmission signal converted at the first mixer via the second selecting switch in the first communication system and transmitting the transmission signal to the antenna via the first selecting switch;

a band-pass filter for receiving a transmission signal converted at the first mixer via the second selecting switch in the second communication system and for extracting a signal having a frequency in a predetermined band and transmitting the signal to the antenna via the first selecting switch, wherein the signal of the band-pass filter does not pass through the duplexer; and a second mixer for converting a signal outputted from the duplexer on the basis of the second frequency and outputting the signal.

15. The wireless transceiver system of claim 14, further comprising:

a third selecting switch for selecting one of the first local oscillator or the second local oscillator according to a communication system.

16. The wireless transceiver system of claim 15, wherein the first local oscillator oscillates only a transmission frequency in the first communication system and is turned off in the second communication system to prevent interference with the second local oscillator.

17. The wireless transceiver system of claim 15, wherein the second local oscillator oscillates a reception frequency in the first communication system and oscillates a transmission/reception frequency in the second communication system.

18. The wireless transceiver system of claim 15, wherein the third selecting switch provides the first frequency to the first mixer as a transmission oscillation frequency in the first communication system and provides the second frequency to the first mixer as a transmission oscillation frequency in the second communication system.

19. The wireless transceiver system of claim 15, wherein the third selecting switch includes a load compensating resistor as a terminating resistance connected to a contact point that is connected to the second local oscillator.

20. The wireless transceiver system of claim 15, wherein the first local oscillator is configured to oscillate a frequency in a first frequency band, and the second local oscillator is configured to oscillate a frequency in a second frequency band adjacent to the first frequency band, so that signal reception in the first communication system and signal transmission/reception in the second communication system can be performed in the first frequency band, and signal transmission in the first communication system can be performed in the second frequency band.

21. The wireless transceiver system of claim 20, wherein signal reception according to the first communication system and signal transmission/reception according to the second communication system in the first frequency band are divided by the band-pass filter.

22. The wireless transceiver system of claim 20, further comprising an additional band-pass filter for extracting a signal having a frequency in the second frequency band from a signal outputted from the second selecting switch when the first communication system is employed.

23. The wireless transceiver system of claim 14, wherein the first communication system is an FDD system, and the second communication system is a TDD system.

24. The wireless transceiver system of claim 14, wherein the first selecting switch selects and fixes a transmitting/receiving path between the antenna and the duplexer in the first communication system, the first selecting switch selecting one between the duplexer and the band-pass filter according to a transmission/reception mode of a signal in the first communication system to determine a path of a transmission/reception signal.

25. The wireless transceiver system of claim 14, wherein the second selecting switch is connected to a transmitting-end of the duplexer in the first communication system, while the second selecting switch transmits a signal in a predetermined frequency band to the antenna through the band-pass filter in the second communication system.

\* \* \* \* \*